United States Patent

Bauer

[11] 3,971,409
[45] July 27, 1976

[54] PRESSURE REGULATOR FOR PNEUMATIC SYSTEMS

[75] Inventor: Friedrich Bauer, Vienna, Austria

[73] Assignee: Hoerbiger Ventilwerke Aktiengesellschaft, Vienna, Austria

[22] Filed: Oct. 24, 1974

[21] Appl. No.: 517,831

[30] Foreign Application Priority Data
Oct. 25, 1973   Austria ............................ 9073/73

[52] U.S. Cl. .............................. 137/613; 137/510
[51] Int. Cl.² ........................................ F16K 21/00
[58] Field of Search ............................ 137/510, 613

[56] References Cited
UNITED STATES PATENTS

| | | |
|---|---|---|
| 2,973,773 | 3/1961 | Siri .................................. 137/510 X |
| 3,079,946 | 3/1963 | Rosler .............................. 137/510 UX |
| 3,294,114 | 12/1966 | Birkemeier ....................... 137/510 |
| 3,443,580 | 5/1969 | Kreuter ............................ 137/510 X |
| 3,863,841 | 2/1975 | Berthoud ......................... 137/510 X |

Primary Examiner—Harold W. Weakley
Attorney, Agent, or Firm—Watson, Cole, Grindle & Watson

[57] ABSTRACT

A pressure regulator comprises a regulator valve in a casing between a pressure inlet and a pressure outlet, the valve being controlled by a diaphragm subject to inlet pressure and the regulator including a flow restrictor in a passage between the inlet and the diaphragm.

2 Claims, 1 Drawing Figure

U.S. Patent  July 27, 1976  3,971,409
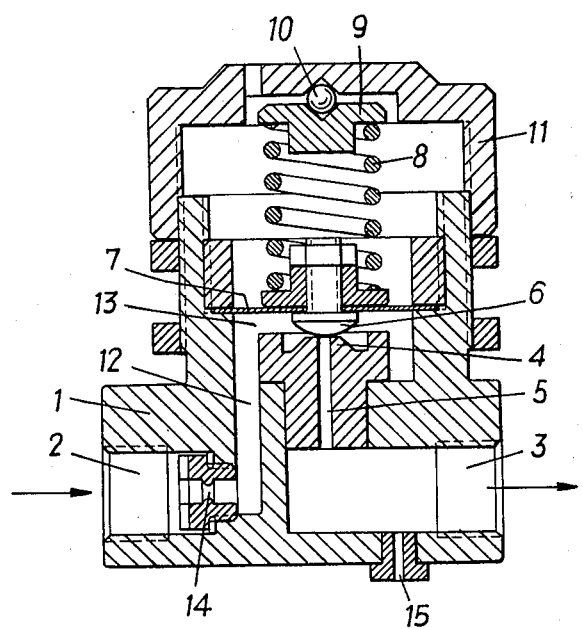

PRESSURE REGULATOR FOR PNEUMATIC SYSTEMS

This invention relates to a pressure regulator for pneumatic systems, for proportionally converting variations of a primary pressure fed to the regulator into amplified variations of a secondary pressure delivered from the regulator. The regulator comprises a casing and a regulator valve situated between the primary pressure side and the secondary pressure side, which valve is controlled by means of a spring-loaded diaphragm acted upon by the primary pressure.

Pressure regulators of the above form are known. They are in use for actuation of control drives as a function of the momentary operating pressure of pneumatic systems, e.g. in the case of infinitely variable control of the delivery volume of compressors for adjustment of the speed of revolution of the entraining engine or for adjustment of a restrictor device installed in the suction pipe as a function of the output pressure of the compressor. In case of a change in the operating pressure which is fed to the pressure regulator as a primary pressure, the passage cross-section opened up by the regulator valve changes, thereby changing the secondary pressure delivered at the outlet of the pressure regulator. Constant venting of the secondary side is concomitantly required however, to prevent excessive pressure build-up therein. To this end, the secondary pressure side is equipped with a discharge orifice leading to the outside. This should be relatively large in the known embodiments, to avoid an excessive sensitivity of the pressure regulator which would cause overcorrections and oscillations, as well as impairing the precision of the setting displacement of the control drive connected thereto. The large discharge orifice results in a constant unfavorably high consumption of air and, moreover, does not allow a sufficiently high output pressure to be reached without difficulty.

An object of the present invention is to provide a regulator in which the sensitivity can be adequately reduced and varied at will even with a small discharge orifice for the secondary pressure side. In accordance with the invention, this is accomplished in that a restrictor is installed upflow of the diaphragm within the feed air passage incorporated in the casing. This restrictor, which in accordance with another feature of the invention, preferably has a smaller passage aperture than the passage cross-section of the fully opened regulator valve, causes a pressure drop so that the diaphragm is no longer acted upon by the full primary pressure. The sensitivity of the pressure regulator is thereby reduced to a level such that a relatively small discharge orifice having a correspondingly low air consumption is sufficient on the secondary pressure side. A high output pressure may moreover be reached, despite reduced sensitivity of the pressure regulator. The pressure regulator thus provides a proportional substantially oscillation-free governing action and a precise actuation of the mechanism connected thereto.

The invention will now be described by way of an example with reference to the accompanying drawing, which is a cross-section through one form of regulator.

The illustrated pressure regulator comprises a casing 1 with a connection 2 for primary pressure and a connection 3 for secondary pressure. Within the casing 1 is situated a regulator valve comprising a valve seat 4 with a passage 5 and a closure element 6 which controls flow through the passage 5. The closure element 6 is situated on a diaphragm 7 which is clamped within the casing 1 and is biased towards the valve seat 4 by means of a coiled compression spring 8. The coiled compression spring 8 is carried by a spring retainer 9 and a ball 10 on a "bell" 11 which is screwed on to the casing 1 and is constructed as a handwheel for setting the preloading of the spring 8. The connection 2 for the input pressure is connected via an air feed passage 12 to a control pressure chamber 13 situated below the diaphragm 7. A restrictor 14 is installed in the air feed passage 12. A discharge orifice 15 inset into the casing 1 leads to the outside from the connection 3 which is in communication with the passage duct 5 of the valve seat 4.

The input pressure fed in at the connection 2 acts on the underside of the diaphragm 7 and lifts the latter against the force of the coiled compression spring 8, thereby lifting the closure element 6 off the valve seat 4 of the regulator valve and opening a passage cross-section of the regulator valve corresponding to the magnitude of the input pressure. The air thus flowing through the regulator valve generates an output pressure at the connection 3 at the output pressure side. The discharge orifice 15 prevents an unrestricted rise of the output pressure caused by the constant inflow of the air through the regulator valve. In case of a change in the input pressure fed in at the connection 2, the diaphragm 7 and thereby the closure element 6 of the regulator valve are displaced, thereby correspondingly varying the open passage cross-section of the regulator valve, so that an output pressure amplified proportionally with respect to the input pressure is generated at the connection 3.

The restrictor 14 installed upstream of the diaphragm 7 in the air feed passage 12 causes a pressure drop so that the diaphragm 7 is not acted upon by the full input pressure. This reduces the sensitivity of the pressure regulator, so that only a relatively small discharge orifice 15 is required. No more than relatively small air volumes flow constantly to the outside through the small discharge orifice 15, so that a small air consumption only of the pressure regulator intervenes, and a relatively high maximum output pressure is obtainable. A practically damped, precisely proportional control action accompanied by avoidance of overcorrections is thus obtained.

I claim:

1. A pneumatic pressure amplifier for proportionally converting variations in an input pressure into amplified variations of an output pressure, comprising:
    a housing including an inlet connected to receive a variable input pressure and an outlet having a fixed opening;
    a regulator valve mounted within said housing between said inlet and said outlet and including a valve seat with a passage and a closure element for controlling fluid flow through said passage;
    a diaphragm mounted within said housing for supporting said closure element and biased against said valve seat to subdivide said housing;
    means for adjustably biasing said diaphragm in a direction opposite to the pressure from said inlet for controlling the operation of said valve;
    a flow restrictor for reducing the pressure from said inlet and mounted upstream of said diaphragm in a feed passage from said inlet and having a cross-sectional area smaller than the cross-sectional area of the regulator valve when fully open; and a pressure chamber interconnecting said restrictor with said closure element;

a restrictive discharge orifice having a fixed opening less than the opening of said outlet mounted downstream of said regulator valve leading to said outlet for restricting the rise of pressure within said outlet.

2. A pneumatic pressure amplifier as in claim 1 wherein said means for adjustably biasing said diaphragm includes a spring, and a rotatable bell threaded on said housing for retaining said spring against said diaphragm whereby rotation of said bell varies the spring tension of said spring.

* * * * *